UNITED STATES PATENT OFFICE.

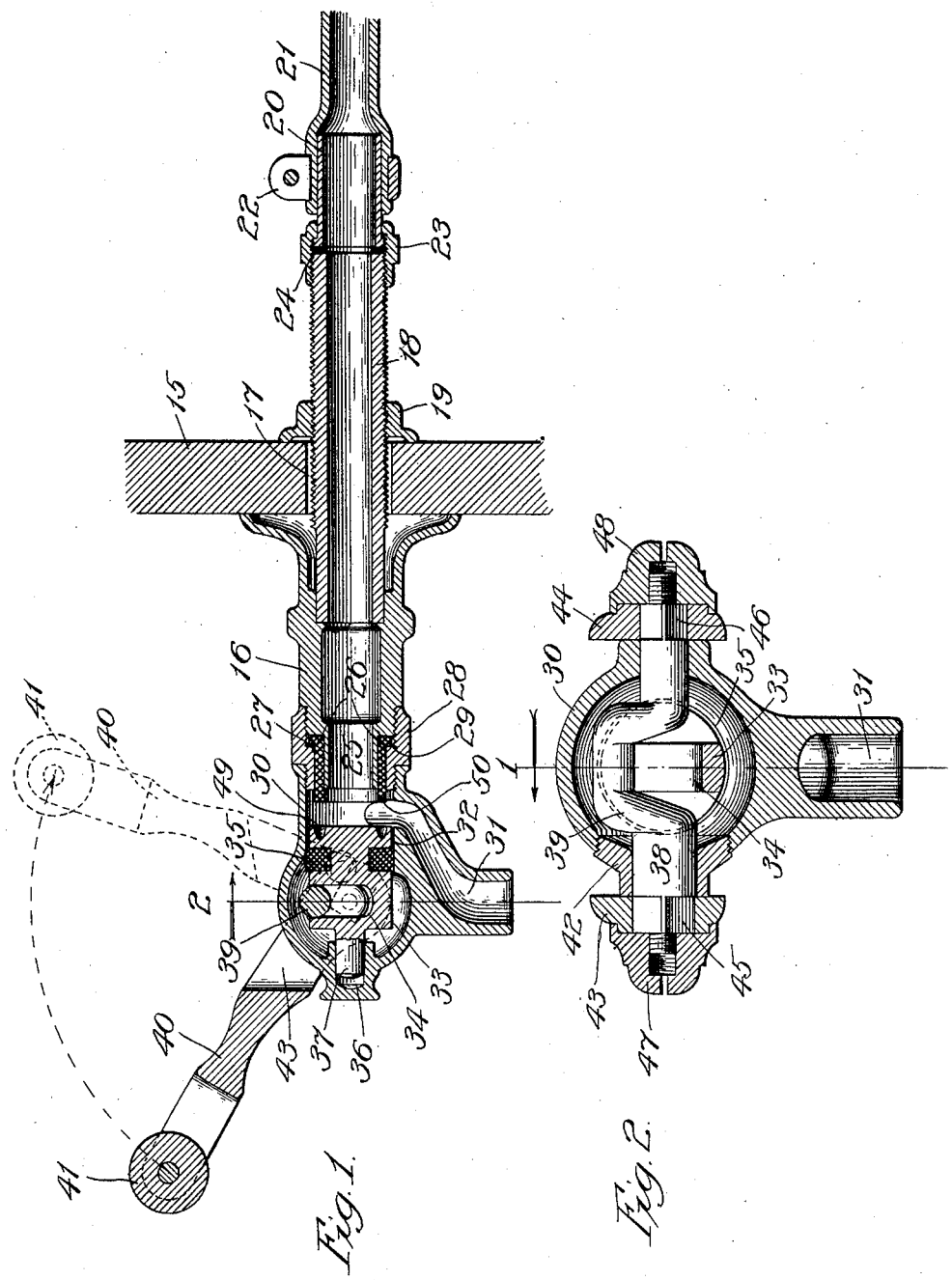

FRANK GRUSCHOW, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

FAUCET.

1,003,179.      Specification of Letters Patent.      Patented Sept. 12, 1911.

Application filed March 24, 1908. Serial No. 422,918.

*To all whom it may concern:*

Be it known that I, FRANK GRUSCHOW, a citizen of the United States, residing at Chicago, in the county of Cook and State of Illinois, have invented certain new and useful Improvements in Faucets, of which the following is a specification.

The object of my invention is to provide a new and improved liquid faucet that shall be adapted to close with security, and yet when opened will permit the free and unobstructed flow of the liquid therethrough. In addition to this, my invention meets various other objects which will be made apparent in the following specification and claims, taken in connection with the accompanying drawings, in which—

Figure 1 is a longitudinal section taken on the line 1 of Fig. 2, and Fig. 2 is a transverse section taken on the line 2 of Fig. 1.

My improved liquid faucet is adapted to be attached directly to a cask or other vessel containing a liquid such for instance as beer; or if desired, it may be attached to a wall 15 of an ice box or other chamber from which a conduit may be conducted to the vessel containing the liquid. A member 16 is provided which is adapted to be clamped against the outside face of the wall 15. Through the hole 17 in the wall the threaded pipe 18 extends from the member 16 and the nut 19 serves to clamp these parts tightly to the said wall. A short length of pipe 20 is provided to which a hose 21 is attached by means of a clamp 22. A union nut 23 and an interposed gasket 24 serve to connect the parts together, as shown in Fig. 1. Extending from the outer end of the member 16 is a short sleeve 25 and surrounding this is a cylindrical packing member 26 of rubber or other suitable yielding material. This has a flange 27 at its rear end. An outer sleeve 28 has a shoulder 29 which is adapted to abut against the flange 27 and thus clamp the packing member 26 tightly against the member 16. Attached to the sleeve 28 is the head 30 which comprises a downwardly directed channel 31 to conduct the liquid to the outlet. Opposed to the packing member 26 the head 30 has a cylindrical seat 32 in which a valve member 33 is adapted to reciprocate, packing 35 being inserted in an annular groove therein to afford a tight fit. This valve member 33 has a vertical transverse notch 34 and also has a prolongation 37 which is adapted to reciprocate in the guiding slot 36 in the head 30. As is apparent in Fig. 1, the packing member 26 projects at the left, thus forming a valve seat 50. On the opposed face of the valve member there is an annular groove 49 which is adapted to fit over the valve seat 50, when the valve is closed. A transverse shaft 38 is mounted to rotate in the head 30, and has a cranked portion 39 which engages the aforesaid notch 34. An arm 40 has a handle 41 at its outer extremity, while its inner extremity is forked, the two branches 43 and 44 of the fork engaging the squared ends 45 and 46 of the shaft 38. The bushing 42 for one end of the shaft 38 is removable, as may be seen from an inspection of Fig. 2, the purpose of this being to facilitate the removal of the shaft 38 in the direction of its length from the head 30. Lock nuts 47 and 48 clamp the branches 43 and 44 in place.

As shown in Fig. 1, this liquid faucet is adapted to be connected through a wall to a more or less distant vessel, but it may readily be observed that if the gasket 24 and the parts to the right thereof were removed, and if 15 were the wall of the liquid containing vessel, then the faucet would operate to control the flow of liquid from that vessel. It will be observed that as the handle 41 is thrown forward to close the valve, the crank 39 comes down to a horizontal or nearly horizontal position, and thus locks the valve in closed position. The packing 35 prevents the liquid from getting back into the crank chamber. At no time is there any great pressure against this packing, for when the valve is open the liquid has a free outlet through the channel 31, and when the valve is closed the packing 26 prevents the outflow of the liquid. This packing 26 and the co-acting annular groove 49 afford a very effective valve seat and valve face. The projecting end of the packing 26 wedges into the annular groove 49 without any marked distortion, and thus while a tight fit is secured the durability of the packing is not impaired. When the valve is opened a free and direct passage for the liquid is afforded, so that it escapes without undue agitation.

It will be observed that when the valve is closed against its seat the projecting end of the cylindrical packing 26 projects within the annular channel 49 in the valve, so that the flexible end of the packing overlaps the circular walls of the annular channel 49. The pressure within the cylindrical yielding packing consequently forces the same outwardly into contact with the surrounding circular wall of the groove, so that the pressure itself insures a close seating of the valve. Should the exterior of the end of the flexible packing be subjected to pressure, it will be forced inwardly into close contact with the inner wall of the channel, thereby preventing any leakage between the valve and the packing.

It will be observed that I have provided a liquid faucet in which a very secure closure against the outflow of the liquid may be effected, but in which the valve seat and the valve face co-act without undue distortion, and, therefore, great durability is attained. This advantage is further increased by the fact that the valve member reciprocates without rotation, and thus there is no tendency to grind the valve seat on the valve. Another feature of importance is the means for clamping the yielding valve seat in place, whereby it is prevented from being dislodged by the outflowing current of liquid.

I claim:—

1. In a faucet, a cylindrical packing member, a flange at one end thereof, a short length of tube within said packing member, a shoulder on the outside of said tube against which the flange abuts, an outer sleeve adapted to clamp the flange to the said shoulder, the opposite end of the packing member projecting to form a radially yielding valve seat, a reciprocating valve member with an annular groove adapted to engage said seat, and means for reciprocating said valve member located on the opposite side thereof from its grooved face and adapted to seat the valve member toward the discharging fluid.

2. In a faucet, a valve seat consisting of a hollow cylinder clamped between inner and outer hollow cylinders and projecting slightly beyond them, in combination with a reciprocating valve member having an annular groove on its face adapted to engage said seat, and means for reciprocating said valve member located on the opposite side thereof from its grooved face and adapted to seat the valve member toward the discharging fluid.

3. In a faucet, a cylindrical packing member, a flange at one end thereof, a short length of tube within said packing member, a shoulder on the outside against which the flange abuts, an outer sleeve adapted to clamp the flange to the said shoulder, the opposite end of the packing member projecting to form a radially yielding valve seat, and a valve member adapted to engage said seat, and means for actuating said valve member located on the opposite side thereof from the valve seat and adapted to seat the valve member against the discharging fluid.

4. In a valve, the combination with a radially yielding cylindrical member, of a coöperating member having a rigid cylindrical wall, and means located on the opposite side of the coöperating member from the radially yielding member for relatively moving the rigid cylindrical wall of one member against the flow of the fluid and into overlapped position with the end of the yielding member and for moving said members away from each other.

In testimony whereof, I have subscribed my name.

FRANK GRUSCHOW.

Witnesses:
GEO. L. WILKINSON,
EDYTHE M. ANDERSON.

---

Copies of this patent may be obtained for five cents each, by addressing the "Commissioner of Patents, Washington, D. C."